United States Patent [19]
Sato et al.

[11] Patent Number: 5,189,468
[45] Date of Patent: Feb. 23, 1993

[54] HARD COPY GENERATING METHOD AND DEVICE USING A LIQUID CRYSTAL PANEL

[75] Inventors: Masamichi Sato; Jun Yamaguchi, both of Tokyo, Japan

[73] Assignee: Fuji Photo Film Co., Ltd., Kanagawa, Japan

[21] Appl. No.: 685,103

[22] Filed: Apr. 15, 1991

[30] Foreign Application Priority Data

Apr. 20, 1990 [JP] Japan .................. 2-102857

[51] Int. Cl.$^5$ .................. G03B 27/04; G03B 27/02
[52] U.S. Cl. .................. 355/88; 355/132
[58] Field of Search .................. 355/18, 99, 100, 132, 355/40, 32, 37, 88

[56] References Cited

U.S. PATENT DOCUMENTS 4,236,223  11/1980  Stanley et al. .................. 355/184

FOREIGN PATENT DOCUMENTS

| | | |
|---|---|---|
| 52-89915 | 7/1977 | Japan . |
| 60-119552 | 6/1985 | Japan . |
| 61-123838 | 6/1986 | Japan . |
| 62-16695 | 1/1987 | Japan . |
| 64-10991 | 2/1989 | Japan . |

*Primary Examiner*—Richard A. Wintercorn
*Attorney, Agent, or Firm*—Sughrue, Mion, Zinn, Macpeak & Seas

[57] ABSTRACT

By using a thermal development type photosensitive recording medium wherein a latent image is formed in a photocuring composition by exposure, and in which the components related to thermal color development or thermal color bleaching are diffused to form a color picture image within the photosensitive material correponding to the latent image, a picture signal representing a picture is received and an image of the picture is displayed on a liquid crystal panel as a black and white picture image corresponding to the picture signal. The displayed picture image on the liquid crystal panel is exposed on the photosensitive recording medium. Monomer is polymerized in the exposed areas by a photopolymerization initiator. The components related to color development or color bleaching of the unexposed areas are diffused by means of heating the photosensitive recording medium, and a visible picture is formed.

8 Claims, 5 Drawing Sheets

HARD COPY GENERATING METHOD AND DEVICE USING A LIQUID CRYSTAL PANEL

BACKGROUND OF THE INVENTION

1. Field of Invention

The present invention relates to a method and device for making a hard copy, and in particular, a method and device for making a hard copy wherein a compact liquid crystal printer is employed to create a hard copy of visible images based on a picture signal.

2. Description of the Prior Art

In the past, several conventional devices were available as a recording method and device for recording visible images.

For example, an image recording device which reproduces a picture image on a cathode ray tube (CRT) by means of receiving the picture signal of a picture image shot by an electronic still camera, and prints the CRT image on instant photosensitive material is described in the pending patent application of this applicant, namely, Japanese Patent laid-open Publication No. 16695/1987. Also, there is a device which uses an optical system based on optical fiber or lenses to expose the CRT display image on the instant photosensitive material. Moreover, for example, a thermal printer is available which transfers thermodiffusive sublimate dye to an image receiving medium to obtain a hard copy of a picture image, as is recorded in Japanese Patent Publication No. 10991/1989.

However, in the above mentioned devices, the picture images deteriorate due to contact between the recording head, which formed a picture image on the recording medium, and the recording material. Also, waste material such as ink ribbons and donor film is a by product of these devices, which do not satisfy the desire for a fully dry system.

SUMMARY OF THE INVENTION

It is therefore an object of this invention to solve the above mentioned problems and provide a method and device using a liquid crystal panel wherein a fully dry copy printer is employed to obtain a simple and high quality hard copy.

In accordance with the present invention, there is provided a hard copy generating method wherein, in a thermal development type photosensitive recording medium, a latent image is formed in a photo-curing composition by the exposure process. The components of the composition related to color development or color bleaching are diffused, by means of being heated, to form a picture image within the photosensitive material corresponding to the latent image. A picture signal of a picture image is received and displayed on a liquid crystal panel as a black and white picture image corresponding to the picture signal. The thermal recording medium is exposed to rays irradiated from a light source through the liquid crystal. The exposed areas are then photo-cured to form a latent image. The thermal development type recording medium is heated so as to diffuse the components related to color development or color bleaching in the unexposed areas, forming a visible picture image.

Also, the hard copy generating device has a means for displaying a picture image on a liquid crystal panel as a black and white picture image corresponding to picture signal and exposing the thermal development type recording medium to the picture image through a liquid crystal panel. Input means is supplied for receiving the picture signal, and recording medium receptacle means is provided for holding the thermal development type recording medium. A liquid crystal panel for displaying a picture image corresponding to the picture signal, is positioned facing the photosensitive surface of the thermal development type photosensitive recording medium. A ray emitting means is provided for emitting exposure rays with wavelengths to which the said thermal development type recording medium responds. An optical system for guides the exposure rays from the ray emitting means to the liquid crystal panel as a virtually parallel beam, and a thermal developing means for heats the exposed thermal development type photosensitive medium in order to thermo-develop its photosensitive layers. The liquid crystal panel is placed in tight contact with the photosensitive surface of said thermal development type photosensitive medium during operations.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Figure 1:
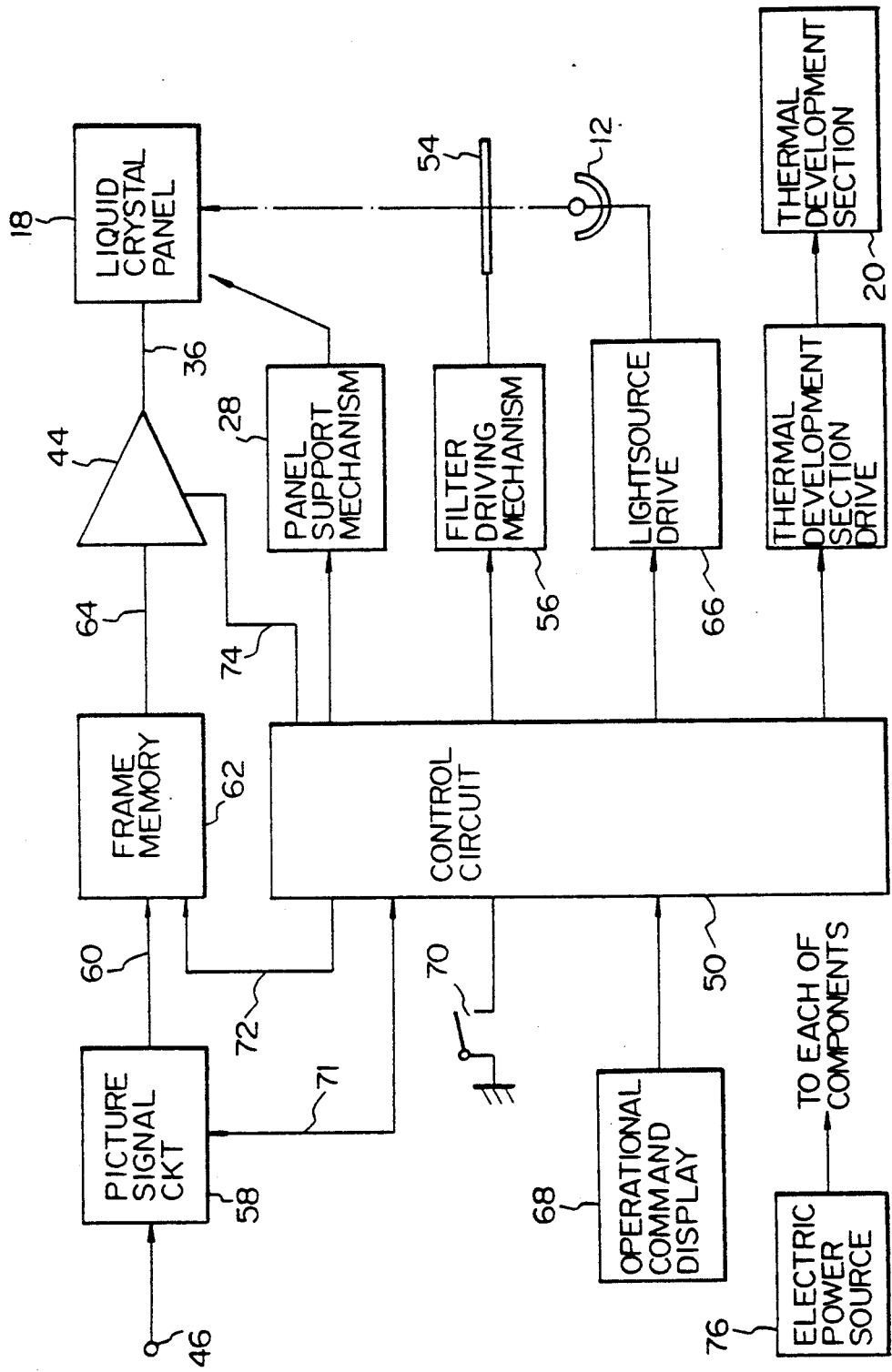
FIG. 1 is a functional block drawing which shows an example of the circuit configuration of a video printer used in an embodiment of this invention for making a hard copy.
Figure 2:
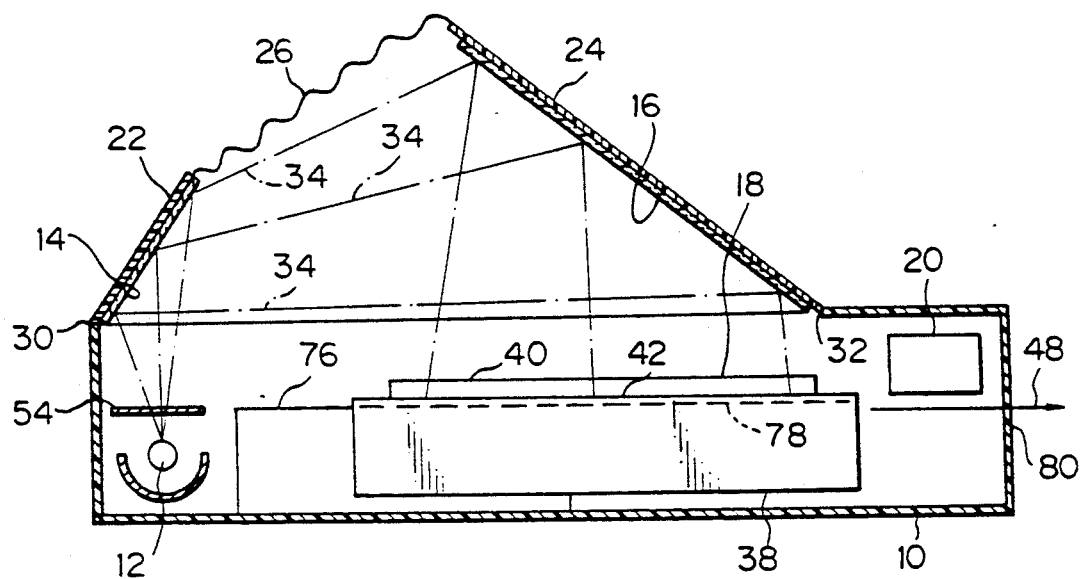
FIG. 2 is a cross section side view which shows the state of the printer when in operation.
Figure 3:
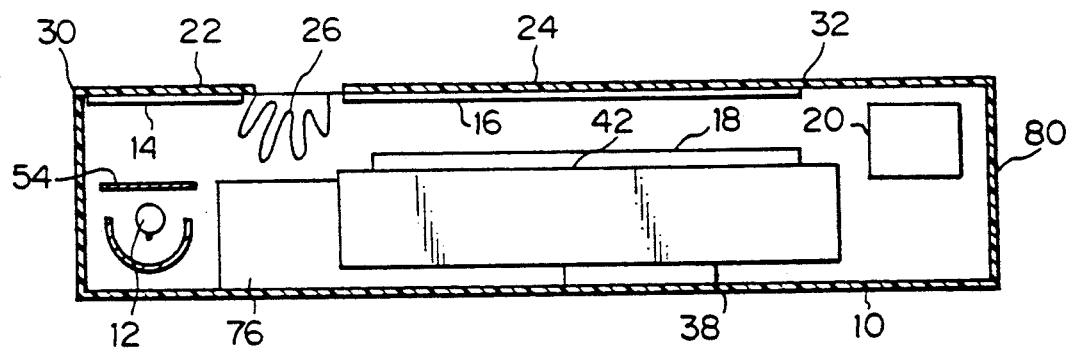
FIG. 3 is a cross section side view which shows the state of the printer when not in use.

A printer employed in the preferred embodiment of the method of the present invention for making a hard copy is shown in FIG. 1, FIG. 2, and FIG. 3.

This printer is a color picture printing device equipped with a liquid crystal panel 18. A color picture signal is supplied through input terminal 46 to record a picture image on recording medium 78, which will be later later, as a hard copy based on this color picture signal. The liquid crystal panel 18 displays a picture image for each signal for the three respective primary colors, red, green and blue, based on the color picture signal. Optical filter 54 passes light components, which correspond to red, green or blue, to liquid crystal panel 18. In this case, the color components may be selected to be the hues developed by cyanogen, magenta, or yellow. As a result of this process, the light component which passed through liquid crystal panel 18 is irradiated to expose recording medium 78.

As was described above, the method of this application example for generating a hard copy is characterized by that a picture image is separately displayed on liquid crystal panel 18 for each color component, exposed on the photosensitive material layer of recording medium 78 for each color component, and afterwards, recording medium 78 is heated for thermal development.

Figure 8:
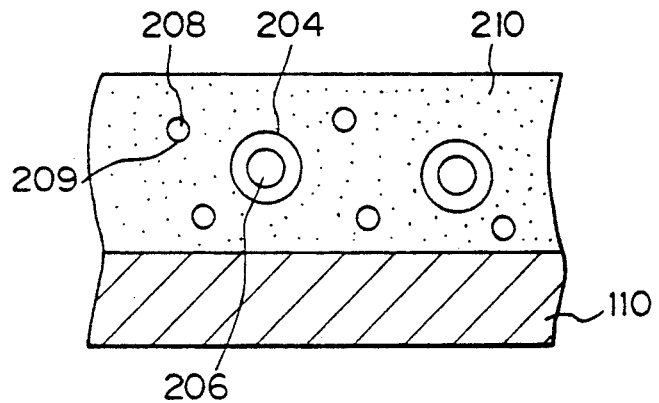
FIG. 8 is a cross section view which shows the photosensitive layer of the positive type photosensitive recording medium in FIG. 6.

Photosensitive material layer 200 of recording medium 78 consists of, as is shown in FIG. 8, binder 210, electron donative leuco dye 206 contained in micro capsule 204, and droplet 209 positioned around micro capsule 204. This droplet 209 is composed of chemical compound 208 (vinyl polymerizable electron acceptive compound) containing in itself both an electron acceptive component and a vinyl monomer component, and a photopolymerization initiator. In the exposed areas of photosensitive material 200, polymerizable electron acceptive compound 208 is photopolymerized by the photopolymerization initiator in this droplet 209, and as a result of this process, electron acceptive compound 208 is photo-cured and immobilized. These photo-cured areas of the recording medium become incapable of development colors since electron acceptive compound 208 and electron donative leuco dye 206 cannot make contact even when they are heated. On the other hand, in the unexposed areas of the recording material 200, electron acceptive compound 208 penetrates the wall of micro capsule 204 when it is heated, and contacts electron donative leuco dye 206 in the capsule 204 to causes this electron donative leuco dye 206 to develop colors, creating a positive picture image. In this case, recording medium 78 offers a positive picture image, but in this embodiment, it is acceptable to use a recording medium which offers a negative picture image.

Figure 9:
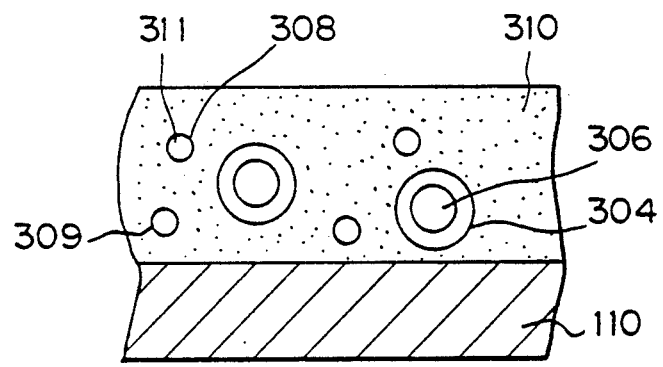
FIG. 9 is a cross section view which shows the photosensitive layer of the negative type photosensitive recording medium in FIG. 6.

When a negative image is to be obtained, photosensitive material layer 300 of the recording medium consists of, as is shown in FIG. 9, binder 310, electron donative leuco dye 306 contained in micro capsule 304, and droplet 309 positioned around micro capsule 304. This droplet 309 is composed of electron acceptive compound 308, polymerizable vinyl monomer 311 capable of bleaching the colors developed by the reaction between electron donative leuco dye 306 and electron acceptive compound 308, and the photopolymerization initiator. In the exposed areas of photosensitive material 300, photopolymerization of color bleaching vinyl monomer 311 is caused by the photopolymerization initiator in this droplet 309, immobilizing vinyl monomer 311. In these photo-cured areas of the recording medium, electron acceptive compound 308 and electron donative leuco dye 306 make contact to develop colors when the areas are heated. On the other hand, in the unexposed areas of photosensitive material 300, color bleaching vinyl monomer 311 penetrates the wall of micro capsule 304 when the recording medium is heated, and bleaches the color developed through the contact between electron donative leuco dye 306 in the capsule 304 and electron acceptive compound 308, creating a negative picture image.

Referring back to FIG. 1, liquid crystal panel 18 is a means for displaying visible picture images, in which a large number of liquid crystal elements are two-dimensionally arranged as a rectangular matrix array. When this liquid crystal panel 18 is driven by driving input 36, corresponding to the picture signal, each of the liquid crystal display elements is turned on or off to display a black and white picture image. This driving input 36 is supplied by driving circuit 44. Liquid crystal panel 18 changes its optical transmittance, corresponding to the picture element density given by picture signal, when it is driven to correspond a picture signal. Therefore, beam 34 which enters one of the primary surfaces, surface 40 of panel 18, is intensity-modulated to correspond to the density component of the picture signal, and is sent out as the transmission light from the other primary surface, surface 42.

Figure 4:
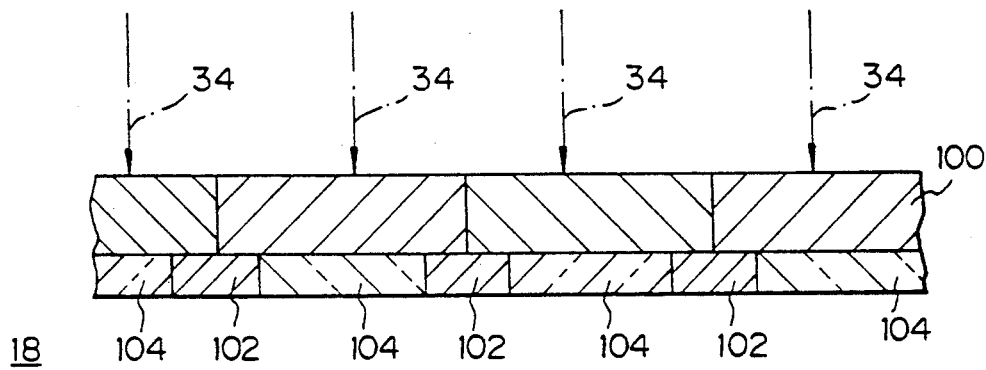
FIG. 4 is a cross section side view which shows the liquid crystal panel used in a preferred embodiment when the light is blocked.
Figure 5:
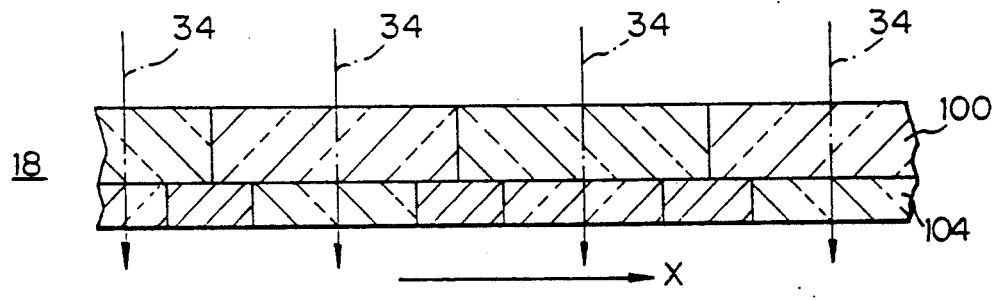
FIG. 5 is a cross section side view which shows the liquid crystal panel used in the preferred embodiment when the light is transmitted.

Rough sketches of the cross section of this liquid crystal panel are shown in FIG. 4 and FIG. 5. FIG. 4 shows the non-transmissive state of the liquid crystal shutter, and FIG. 5 shows the transmissive state of shutter 100. In this embodiment, the so-called active matrix driving system is adopted for driving circuit 44 and liquid crystal panel 18. Its scanning timing signal is supplied from control circuit 50 in FIG. 1 through control wire 74.

Figure 6:
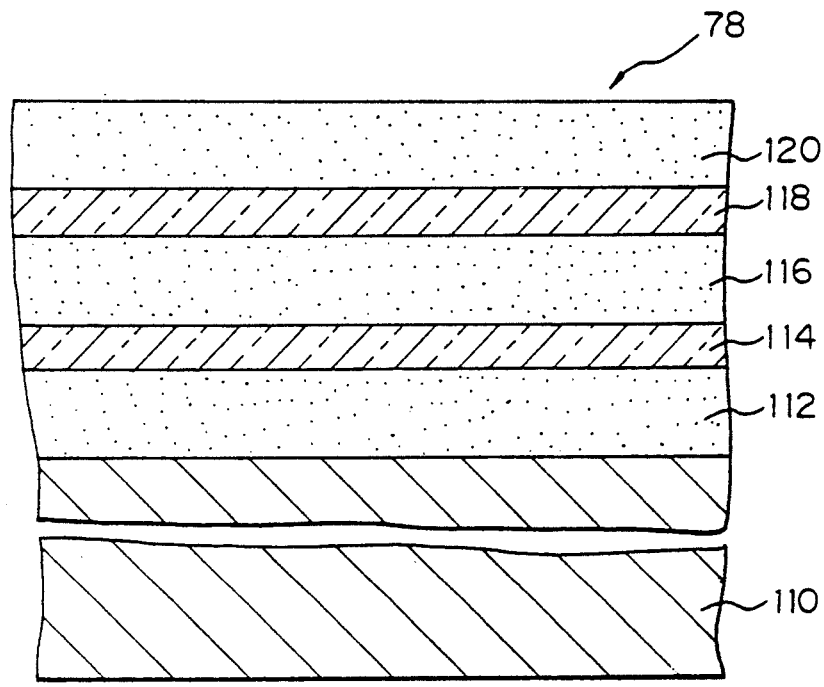
FIG. 6 is a cross section view which shows the configuration of the photosensitive recording medium in layer used in an embodiment of the present invention.
Figure 7:
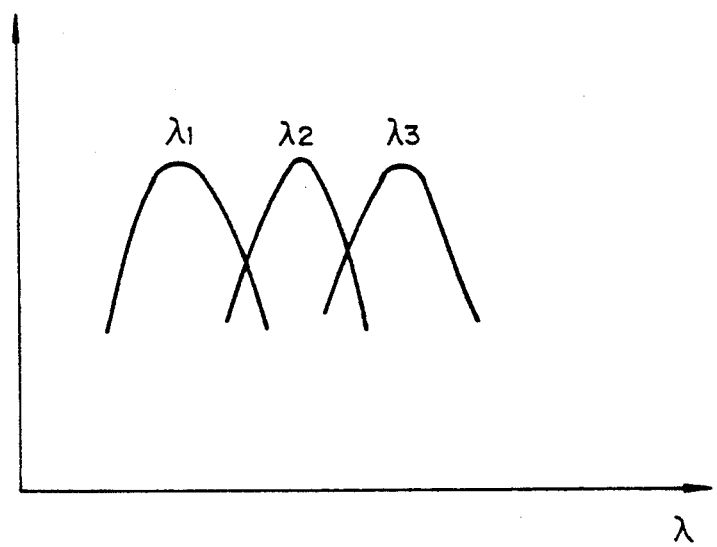
FIG. 7 is a graph which shows the photosensitive characteristics of respective layers in the photosensitive recording medium in FIG. 6.

In order to obtain a hard copy of a color picture image through the use of liquid crystal panel 18 which creates a visible black and white image, this method uses recording medium 78 as is shown in FIG. 6. As is also shown in the same figure, recording medium 78 is composed of λ3 photosensitive layer 112, λ2, photosensitive layer 116, and λ1 photosensitive layer 120, wherein those layers are formed on base material 110 through processes such as lamination, coating, evaporation, or the like. Optical filter (F2) 114 is sandwiched between λ3 photosensitive layer 112 and λ2 photosensitive layer 116, and optical filter (F1) 118 is positioned between λ2 photosensitive layer 116 λ1 photosensitive layer 120.

λ3 photosensitive layer 112 is a photosensitive layer which is photosensitive to rays with a center wavelength of λ3 shown in FIG. 7. This wavelength λ3 is, for example, the wavelength of near ultraviolet rays or visible rays ranging from 300 nm to 375 nm. Similarly, λ2 photosensitive layer 116 is a photosensitive layer which is sensitive to rays with a center wavelength of λ2, and λ1 photosensitive layer 120 is a photosensitive layer which is sensitive to rays with a center wavelength of λ1. Wavelength λ2 is, for example, the wavelength of ultraviolet rays or near ultraviolet rays ranging from 350 nm to 420 nm. Wavelength λ3 is, for example, the wavelength of ultraviolet rays or near ultraviolet rays ranging from 375 nm to 450 nm. Filters F2 and F1 are filters which block rays with center wavelengths of λ2 and λ1, respectively. In the case of FIG. 7, wavelengths λ1, λ2, and λ3 overlap, but non-overlapping rays may be used; wavelength λ1 ranges from 300 nm to 365 mm, wavelength λ2 from 365 nm to 400 mm, and wavelength λ3 ranges from 400 nm to 450 mm.

As was described above, when recording medium 78 is used to record a color picture image with the printer in FIG. 1, liquid crystal panel 18 is driven at first by the rays with a center wavelength of λ1 to perform the first exposure process, in which λ1 photosensitive layer 120 is exposed. At this time, since the rays with a center wavelength of λ1 is blocked by Filter F1, λ2 photosensitive layer 116 and λ3 photosensitive layer 112 are not exposed. In regard to λ1 photosensitive layer 120, polymerizable electron acceptive compound 208 is polymerized, as was stated before, by the photopolymerization initiator in the areas which are exposed corresponding to the picture image displayed on liquid crystal panel 18. As a result of this process, electron acceptive compound 208 is photo-cured and immobilized. Electron acceptive compound 208 and electron donative leuco dye 206 cannot make contact to develop colors in this photo-cured section in the recording medium when the medium is heated. On the other hand, electron acceptive compound 208 penetrates the wall of micro capsule 204 in the unexposed areas of $\lambda 1$ photosensitive layer 120 when the medium is heated, and makes contact with electron donative leuco dye 206 in the capsule to cause this electron donative leuco dye 306 to develop colors, creating a positive picture image.

Also, a recording medium for recording a negative picture image may be used in place of the above-mentioned recording medium for a positive picture image.

Next, liquid crystal panel 18 is driven by the rays with a center wavelength of $\lambda 2$ to perform the second exposure process. $\lambda 1$ photosensitive layer 120 is not photosensitive to this ray. $\lambda 2$ photosensitive layer 116 is exposed to these rays with a center wavelength of $\lambda 2$. At this time, since the ray with a center wavelength of $\lambda 2$ is blocked by filter F2, $\lambda 3$ photosensitive layer 112 is not exposed. The photo-curing of electron acceptive compound 208 occurs in the same manner as in the above mentioned case of $\lambda 1$ photosensitive layer 120 in the exposed areas of $\lambda 2$ photosensitive layer 116.

Lastly, liquid crystal panel 18 is driven by the rays with a center wavelength of $\lambda 3$ to perform the third exposure process. $\lambda 1$ photosensitive layer 120 and $\lambda 2$ photosensitive layer 116 do not photosensitively react to these rays, and only $\lambda 3$ photosensitive layer 112 reacts to these rays with a center wavelength of $\lambda 3$.

Liquid crystal panel 18 is driven by the signals of the three color components in the above mentioned manner, and after the three exposures, the thermal development process is performed. Electron acceptive compound 208 penetrates the wall of micro capsule 204 through this thermal development process and makes contact with electron donative leuco dye 206 in the capsule to cause electron donative leuco dye 206 to develop colors in the unexposed areas of the respective photosensitive layers 112, 116, and 120. In the respective exposed areas of the photosensitive layers 112, 116, and 120, electron acceptive compound 208 is photo-cured and immobilized, which makes it impossible for electron acceptive compound 208 and electron donative leuco dye 306 to make contact, preventing the color development.

In the above mentioned manner, $\lambda 3$ photosensitive layer 112, $\lambda 2$ photosensitive layer 116, and $\lambda 1$ photosensitive layer 120 develop their respective colors, creating a hard copy of a color picture image.

The other configuration of the printer of this embodiment shown in FIG. 1 to FIG. 3 is explained.

As is shown in FIG. 2 and FIG. 3, this embodiment is basically constructed by means of assembling light source 12, mirror 14 and 16, liquid crystal panel 18, thermal development section 20 and electric power source 76, in case 10 having a rectangular parallelepipedic shape. Most of the top section of case 10 can be raised or lowered using the two lids 22 and 24 that are attached to said case. Mirror 14 and mirror 16 are fitted on the interior surfaces of lid 22 and lid 24, respectively. Lid 22 and lid 24 are connected at their mutually facing ends with bellows which optically shield the opening of case 10. This arrangement creates a black box out of the interior space of case 10.

Light source 12 is provided near the left side end in case 10, as is shown in the figures. Liquid crystal panel 18 is supported in case 10 by panel support mechanism 28 in FIG. 1 (not shown in FIG. 2 and FIG. 3) so as to position it approximately at the center of the interior space. Lid 22 is attached to case 10 with hinge 30 at the opposite end from the bellows so that it can be manually raised or lowered, and as is shown in the figures, it can be raised to the designated angle and held there, which is slightly wider than 45° from the horizontal position of the lid. In the same manner, lid 24 is also attached to case 10 with hinge 32 at the opposite end from the bellows, so that it can be manually raised or lowered, and can be raised to the designated angle and held there, which is slightly smaller than 45° from the horizontal position of lid, as is shown in the figures.

Light source 12, mirror 14 and mirror 16, and liquid crystal panel 18 are installed so as to have a positional relationship in which, when lid 22 and 24 are raised to the designated angles and held there, beam 34 emitted from light source 12 is reflected by mirror 14 and mirror 16, and enters the primary surface 40 of liquid crystal panel 18 as approximately parallel beams at an approximately perpendicular angle, as is shown in the figures. This device is provided with switch 70, which is turned on when lid 22 and lid 24 are raised to the designated position. As is shown in FIG. 1, this switch 70 is connected to control circuit 50 and detects when lid 22 and lid 24 is raised to the designated positions and sends the detection signal to control circuit 50.

When lid 22 and 24 are lowered, the overall appearance of case 10 becomes flat, like a box, as is shown in FIG. 3, thus changing the shape of this device back to a compact shape.

A plurality of sheets of photosensitive recording medium 78 are stored in recording medium magazine 38. This recording medium 78 is developed by thermal development section 20 after it is exposed to the rays through liquid crystal panel 18 as was explained before, and ejected from case 10. An opening (not shown in the figures) is provided on the side surface of case 10 for inserting recording medium 78. Recording medium 78 is inserted into and also ejected from case 10 through this opening.

When a black and white picture is recorded, only a single layer of photosensitive layer 200 has to be provided on recording medium 78. In this case, the optimum wavelength for photosensitive layer 200 is the wavelengths of 300 nm to 450 nm, ranging from ultraviolet rays to visible rays. Also, the wavelengths of 300 nm to 700 nm are acceptable depending on the type of light source to be used.

As is shown in FIG.2, the uppermost piece of recording medium 78, which is placed in layers in recording medium magazine 38, is developed by thermal development section 20, as is shown by arrow mark 48, and afterwards, it can be ejected from one of the side walls of case 10 by means of a driving mechanism which is not shown in the figures.

Liquid crystal panel 18 is supported in case 10 by a supporting mechanism, which is not shown in the figures, so that it can be moved in the vertical directions in FIG. 2. When this supporting mechanism is operated, liquid crystal panel 18 is lowered so that bottom primary surface 42 of liquid crystal panel 18 makes tight contact with the photosensitive surface of the uppermost piece of recording medium 78, which is placed in layers in recording medium magazine 38. Recording medium 78 is constantly pressed upward by a pressure spring (not illustrated) within recording medium magazine 38. The support mechanism is designed so as to be able to raise liquid crystal panel 18 by a slight distance under the control of control circuit 50 when the uppermost layer of recording medium 78 is going to be ejected from recording medium magazine 38. Liquid crystal panel 18 may be constructed so as to have constant contact with the surface of recording medium 78. Liquid crystal panel 18 must make tight contact with the uppermost picture image recording surface of recording medium 78 in recording medium magazine 38 at least during the operation of this device.

Beam 34 emitted from light source 12 becomes approximately parallel beams through the optical system including mirror 14 and mirror 16, and enters primary surface 40 of liquid crystal panel 18. This assures a clear recording of a picture image on recording medium 78.

Light source 12 used in this method is a type of light source which emits beam 34 of ultraviolet rays or visible rays in a wavelength range near ultraviolet rays, which includes the wavelength $\lambda 1$, $\lambda 2$ and $\lambda 3$, as was stated before. When the above mentioned recording medium 78 is exposed to said beam 34, the beam with the desired wavelength is selected by filter 54, which will be presented later. Moreover, three light sources may be provided to emit each beam 34 of ultraviolet rays or visible rays of wavelengths $\lambda 1$, $\lambda 2$ and $\lambda 3$, respectively. As light source 12, any one of following may be used; mercury light, semiconductor laser, strobe (xenon lamp), tungsten lamp, metal halide lamp, argon gas laser, helium-cadmium laser, or fluorescent light. Light source 12 is driven by light source driving circuit 66 under the control of control circuit 50.

As is shown in the figures, filter 54 is provided immediately in front of the light source 12 in the beam passage of beam 34. Filter 54 is made up of three different filters, each of which transmits one of the above mentioned different wavelengths $\lambda 1$, $\lambda 2$ and $\lambda 3$, respectively. Only one of these three filters is illustrated to avoid complication of the figures, but these filters are supported by filter driving mechanism 56, and constructed so that only one of them is selectively inserted in the passage of beam 34 emitted from light source 12. With this arrangement, beam 34 that is emitted from light source 12 can enter liquid crystal panel as one of the component rays of wavelengths $\lambda 1$, $\lambda 2$ and $\lambda 3$.

If three light sources are provided, an arrangement can be made so that these three light sources are positioned, for example, to form a triangular shape, and each light source is equipped with an appropriate selection of filters 54 to transmit the proper rays. In this case, filter driving mechanism 56 is unnecessary, and a light source driving circuit is provided with the function of selectively driving these light sources so as to emit the desired chromatic component of the light sources.

Referring to FIG. 1, picture signal input terminal 46 is connected to picture signal circuit 58. The picture signal which is supplied through input terminal 46 may have a format of, for example, a television signal or a signal for an electronic still camera. Picture signal circuit 58 is a signal processing circuit which converts the picture signal, which is formatted in the above mentioned manner, into digital data of the three primary colors, red, green and blue. Its output terminal 60 is connected to the data input terminal of frame memory 62. Now then, the picture signal which is supplied through input terminal 46 may take the form of a chromatic component signal of the three primary colors, red, green and blue (RGB), or may be digital data of a similar type. In the case of the latter, picture image signal circuit 58 is unnecessary.

Frame memory 62 is a storage circuit for the purpose of storing one frame equivalent of RGB component data. Frame memory 62 is controlled by control circuit 50 so as to store and read out the data, and output terminal 64 for the read-out data is connected to liquid crystal panel driving circuit 44. Driving circuit 44 drives the raster scanning of the individual picture elements of liquid crystal 18, for example, in frame order, based on the chromatic component data of the three primary colors which are read out from frame memory 62.

Control circuit 50 is a functional control section which coordinates the overall operation of this device. Control circuit 50 is connected to operational command display panel 68, by which an operator can manually input instructions, and operational command display panel 68 can also display the state of this hard copy generating device to the operator.

Electric power source 76 supplies electricity to each of electrical circuit components within the device. It is a direct current power source, for example, a dry battery or a storage battery.

Next, the operation of this device is explained. When recording medium 78 is placed in case 10, liquid crystal panel 18 is lowered by the panel supporting mechanism under the control of control circuit 50 to the position shown in FIG. 2. By this action, the recording surface of the uppermost piece of the photosensitive sheets, which are placed in layers in recording medium magazine 38, makes tight contact with bottom primary surface 42 of liquid crystal panel 18. The operator raises lid 22 and lid 24 and keeps them held at the designated angles shown in FIG. 2. This state is detected by switch 70, and a detection result is sent out to control circuit 50. Control circuit 50 sets each section in the ready condition by this operation.

Next, the output from a picture signal source such as an electronic still camera is connected to picture signal input terminal 46. Then, when operational command display panel 68 is operated to give a command to store the picture signal, control circuit 50 controls picture signal circuit 58 and frame memory 62, through control wire 71 and control wire 72, respectively, to acquire and store said picture signal, which is supplied to input terminal 46. Picture signal circuit 58 converts the supplied signal into a signal with a predetermined format, for example, the digital data of the chromatic component signal of RGB. The converted chromatic component signal is stored in frame memory 62.

Next, the operator operates operational instruction display 68 to input a command for printing a picture image. By this action, control circuit 50 responds so as to operate according to the print command from operational command display panel 68. First, it controls filter driving mechanism 56 to select one of the filters 54 which transmits the rays with a specific wavelength, for example, the rays with a wavelength of $\lambda 1$, and inserts said filter in the passage of beam 34 emitted from light source 12. At the same time, control circuit 50 gives frame memory 62 a command to read out the blue component data. By this operation, the blue component data is sequentially read out in the order of raster scanning. The said data is amplified by driving circuit 44 and supplied as the driving signal to liquid crystal panel 18 from its output terminal 36. Through this procedure, the individual picture elements of liquid crystal panel 18 are driven by the driving signal based on the blue component signal, visualizing a black and white picture image.

Control circuit 50 synchronizes light source driving circuit 66 and liquid crystal panel 18, and causes the light emission of light source 12 for a predetermined period. In the above mentioned manner, the picture image of the blue component is recorded as a latent image in λ1 photosensitive layer 120 of photosensitive material sheet 78 (recording medium 78).

When the recording of the blue component picture image is completed, control circuit 50 performs the same procedures for the picture images of the rest of the color components, namely, the green and red components, exchaning sequentially filter 54 for the appropriate one for each color. At the same time, control circuit 50 reads out the corresponding color component data from frame memory 62 to drive liquid crystal panel 18, and simultaneously drives light source 12 to record each of these picture images in λ2 photosensitive layer 116 and λ3 photosensitive layer of the same photosensitive sheet 78, respectively.

Control circuit 50 can make a color correction for the original picture image by means of adjusting the exposure time of photosensitive sheet 78 by light source 12 in regard to each of the color component images of blue, green, and red. In other words, through this process, the color picture image, which is finished on photosensitive sheet 78 through the process of superimposing sequential exposures, becomes a color corrected picture image.

As the recording of the latent images of three primary colors are completed on photosensitive sheet 78, control circuit 50 controls panel supporting mechanism 28 to raise liquid crystal panel 18 by a slight distance for delivering the exposed photosensitive sheet 78 to thermal development section 20. In addition, control circuit 50 controls thermal development section driving circuit 52 to generate heat for development the photosensitive sheet by thermal development section 20. This thermal development process may be performed for one second to five minutes, preferably, three seconds to one minute, at a temperature of 80° C. to 200° C., preferably, 100° C. to 160° C. Incidentally, it is desirable to photo-cure the unexposed areas by means of exposing the entire surface of the photosensitive layers of recording medium 78 after the thermal development process to prevent photographic fogging. The color development reaction and color bleaching reaction in the unaffected areas are suppressed to improve the shelf life of the picture image by this exposure of the entire surface. Afterwards, recorded recording medium 78 is again thermally developed by thermal development section 20 while it is smoothly delivered from recording medium magazine 38 to delivery passage 48.

In this manner, the color picture image delivered in the form of a picture signal which is supplied through input terminal 46 is made visible on recording medium 78, and this recording medium 78 is ejected through opening 80.

When this device is not in use, lid 22 and lid 24 are folded as is shown in FIG. 3. At this time, control circuit 50 detects this folded state through switch 70, and stops the entire functions of the device.

According to the above mentioned method, since the exposure process is performed by the liquid crystal panel, the printing time is short, and it is also easy to develop a compact hard copy generating device. Moreover, since a mass produced liquid crystal panel 18 can be employed, the device becomes inexpensive. In regard to recording medium 78, since photosensitive layer 200 is photo-cured corresponding to the image created by the exposure light, as was described before, the succeeding thermal development process does not require high accuracy, and can be performed at a lower degree of accuracy. In other words, there is little chance that picture quality is influenced by fluctuations of temperature and development time caused by the thermal development section 20 or irregularities caused by the heating unit. Also, picture quality is not deteriorated by the head contact on recording medium 78 during the development process, and lastly, no waste is generated.

According to the above mentioned method, a high quality hard copy can be obtained, and therefore, said method is suitable for generating a hard copy of a picture image such as transparent film for an overhead projector (OHP) or color slides, and also creating a picture image on a magnetic card such as a telephone card or a prepaid telephone card in Japan.

Incidentally, it may be arranged so that the thermal development process of recording medium 78 may be performed at the same time as the exposure. In addition, in regard to the above mentioned embodiment, the printer is placed in a compact box case, but the present invention is not restricted to a printer placed in a compact box case as long as it is a printer which employs a liquid crystal panel for exposure. For example, the present invention can also be applied to a printing device which exposes photosensitive material to a picture image on the liquid crystal panel through a set of lenses, in other words, a printing device with an enlargement capability (enlargement and reduction).

In regard to each of the above mentioned embodiments, a color picture signal was used for printing a color picture image, but needless to say, this invention can be applied to the printing of a black and white picture image. In the case of a black and white picture image, only a picture signal for a black and white picture image has to be sent to liquid crystal panel 18 from frame memory 62, and filter 54 is not required.

As state of above, in this invention, thermal development type photosensitive material is adopted in which a latent image is formed in the photo-curing composition by the exposure process. The photochemical components related to color development or color bleaching are diffused through a heating process within the photosensitive material to form a color picture image corresponding to the latent image. In this case, a picture signal corresponding to a picture image is received and a picture image corresponding to this picture signal is displayed on the liquid display panel. The thermal development type recording medium is exposed through the liquid crystal panel on which said picture image is displayed, whereby the exposed areas of said recording medium are photo-cured to form a latent image. Afterwards, a visible picture image is formed by means of heating said thermal development type recording medium and diffusing the photochemical components related to color development or color bleaching in the unexposed areas. As the result of earnest researches, we have found out that a fully dry system which offers high picture quality and generates no waste can be implemented by means of employing the above mentioned hard copy generating method.

As the recording medium which can be used for this invention, the material disclosed in Japanese Patent laid-open Publication No. 89915/1977 is known, besides the one described in the above mentioned embodiment. This is a material wherein two components of a two-component type thermal color development material, for example, an electron acceptive compound and an electron donative leuco dye, are separately placed, one within the micro capsule containing the photo-curing composition and the other outside of it, or on both sides. In the case of this material, even if the photo-curing composition within the micro capsule is sufficiently cured, the color development in the cured areas cannot be properly suppressed, which causes slight coloration of the areas with no image and has a tendency to deteriorate the contrast. Therefore, as a more desirable material which causes no coloration of the areas with no image, a type of recording material is known in which are formed a layer of photopolymerizable composition consisting of vinyl monomer with acidic radicals and photopolymerization initiator, a separation layer, and a layer of electron donative leuco dye, as is disclosed in Japanese Patent laid-open Publication No. 123838/1986. In the case of this material, since acidic radicals in the areas with no image, in other words, the areas which are cured by photopolymerization, lose most of the thermal diffusibility, the areas with no image are not going to be colored. However, this material has a drawback in that the color development density is slightly lower.

As a method to obtain a negative picture image using the same type of system, there is, for example, the method disclosed in Japanese Patent laid-open Publication No. 119552/1985. This method uses recording material in which a layer of photopolymerizable composition consisting of monomer or prepolymer, which bleaches pigment; a separation layer; and a layer of pigment, which is bleached by the monomer or prepolymer, are formed. This material also has a fault similar to that of the above material.

Now then, as the most desirable material which has overcome the problems of the coloration in the areas with no image and the low picture image density, there is the material recorded in Japanese Patent Application No. 224930/1989, which is a patent applied for by this applicant. In this material, one of the two components of a two-component type thermal color development material is contained within a micro capsule, and the other component is positioned outside this micro capsule as a curing compound for photo-curing composition, or the other component was positioned outside the micro capsule, together with the photo-curing composition.

The material recorded in Japanese Patent Application No. 19710/1990 of this applicant can be named as the material for a negative picture image adopting a similar concept. In this recording material, a backing material is coated with a layer which holds a photopolymerizable composition containing an electron acceptive compound, polymerizable vinyl monomer and a photopolymerization initiator, and micro capsules containing electron donative leuco dye.

These photosensitive recording mediums can be made to take the form of a multicolor recording medium if necessary. Basically, the only thing important here is to use a recording medium which has a plurality of photosensitive layers for the different hues which are obtained by thermal development processes corresponding to different photosensitive wavelengths.

The recording mediums described in Japanese Patent Application No. 224930/1989 and Japanese Patent Application No. 19710/1990 can be named as examples of a more desirable multicolor recording medium. For example, one of the listed examples is a multicolor recording medium which has a plurality of photosensitive layers corresponding to different colors, and at least three layers of photosensitive layers are formed on the base material. In other words, the layers are configured in the following order, from the exposure light source side toward the base material side of the recording medium; the first photosensitive layer which is photosensitive to rays with a center wavelength of $\lambda 1$, the intermediate layer which absorbs rays with a center wavelength of $\lambda 1$, the second photosensitive layer which is photosensitive to rays with a center wavelength of $\lambda 2$ and develops a different color from the first photosensitive layer, an intermediate layer which absorbs rays with a center wavelength of $\lambda i-1$, and the ith photosensitive layer which is photosensitive to rays with a center wavelength of $\lambda i$ and develops a different color from the preceding photosensitive layers ($\lambda 1 < \lambda 2 < \ldots < \lambda i$). Therefore, a more desirable hard copy could be generated using this recording medium in the same manner as the above mentioned embodiment example.

While present invention has been described with reference to the particular illustrative embodiment, it is to be understood that various modifications in its configuration may be adopted without departing from the spirit of the invention or the scoop of the following claims.

What is claimed here is:

1. A method of generating a hard copy from a video signal, comprising the steps of:

receiving a video signal corresponding to an image;

displaying said image on a liquid crystal display panel in the form of a black and white image corresponding to said video signal;

exposing a thermal development, photosensitive recording medium to radiation from a light source so as to form a photocured latent image on said recording medium, said radiation passing through said liquid crystal display panel before reaching said recording medium;

heating said recording medium so as to diffuse components related to one of color development and bleaching in unexposed areas of said recording medium thereby forming a visible image thereon;

said recording medium being sensitive to radiation having wavelengths in the range of 300 nm to 700 nm.

2. A method of generating a hard copy from a video signal, comprising the steps of:

receiving a video signal corresponding to an image;

displaying said image on a liquid crystal display panel in the form of a black and white image corresponding to said video signal;

exposing a thermal development, photosensitive recording medium to radiation from a light source so as to form a photocured latent image on said recording medium, said radiation passing through said liquid crystal display panel before reaching said recording medium;

heating said recording medium so as to diffuse components related to one of color development and bleaching in unexposed areas of said recording medium thereby forming a visible image thereon;

said recording medium being sensitive to radiation having wavelengths in the range of 300 nm to 450 nm.

3. A method of generating a hard copy of a color image corresponding to a video signal, comprising the steps of:

receiving a signal corresponding to a color component of a video signal;

displaying an image corresponding to said color component on a liquid crystal display panel in the form of a black and white image;

exposing a thermal development, multicolor, photosensitive recording medium to radiation having a predetermined wavelength so as to produce a latent image in said recording medium corresponding to said color component, said radiation passing through said liquid crystal display panel before reaching said recording medium;

repeating said receiving, displaying and exposing steps a plurality of times where said predetermined wavelength corresponds to said color component so as to form a plurality of latent images each corresponding to a color component of the color image.

4. A hard copy generating method according to claim 3 wherein said recording medium is a thermal development type recording medium and has a plurality of photosensitive layers which each respond to different colors, and at least three layers of photosensitive layers are formed on a base material, said layers being structured in following order from the exposure light source side toward the base material side of said recording medium; a first photosensitive layer which is photosensitive to rays with a center wavelength of $\lambda 1$, an intermediate layer which absorbs rays with a center wavelength of $\lambda 1$, a second photosensitive layer which is photosensitive to rays with a center wavelength of $\lambda 2$ and develops a color different from that of the first photosensitive layer, an intermediate layer which absorbs rays with a center wavelength of $\lambda i-1$, where $i \geq 3$ and an ith photosensitive layer which is photosensitive to rays with a center wavelength of $\lambda i$ and develops a color different from that of the proceeding photosensitive layers, and ($\lambda 1 < \lambda 2 \ldots \lambda < \lambda i$).

5. A hard copy generating method according to claim 4, wherein said multicolor recording medium is provided with a first to third photosensitive layer, the wavelengths to which the first photosensitive layer is responsive are the wavelengths of 300 nm to 700 nm, ranging from ultraviolet rays to visible rays, the wavelengths to which the second photosensitive layer is responsive are the wavelengths of 350 nm to 420 nm, ranging from ultraviolet rays to visible rays, and the wavelengths to which the third photosensitive layer is responsive are the wavelengths of 375 nm to 450 nm, ranging from ultraviolet rays to visible rays.

6. A hard copy generating method according to claim 4, wherein said multicolor recording medium is provided with a first to third photosensitive layer, the wavelengths to which the first photosensitive layer is responsive are the wavelengths of 300 nm to 365 nm, ranging from ultraviolet rays to visible rays, the wavelengths to which the second photosensitive layer is responsive are the wavelengths of 365 nm to 400 nm, ranging from ultraviolet rays to visible rays, and the wavelengths to which the third photosensitive layer is responsive are the wavelengths of 400 nm to 450 nm, ranging from ultraviolet rays to visible rays.

7. A hard copy generating device comprising:

a display for displaying a picture image on a liquid crystal panel as a black and white picture image corresponding to a picture signal and exposing a thermal development type recording medium to said picture image through said liquid crystal panel;

an input for receiving said picture signal;

a recording medium receptacle for holding said thermal development type recording medium;

a liquid crystal panel for displaying a picture image corresponding to said picture signal to be positioned facing the photosensitive surface of said thermal development type photosensitive recording medium;

a ray emitting device for emitting exposure rays of wavelengths to which said thermal development type recording medium responds;

an optical system for guiding said exposure rays from said ray emitting device to said liquid crystal panel as virtually parallel beams; and a thermal developer for heating the exposed thermal development type photosensitive medium in order to thermo-develop its photosensitive layers;

said liquid crystal panel being placed in tight contact with the photosensitive surface of said thermal development type photosensitive medium in the operating condition; and the hard copy generating device further comprising a compact box for enclosing said display, input recording medium receptacle, liquid crystal panel, ray emitting device, optical system and thermal developer.

8. A hard copy generating device according to claim 7, wherein said compact box comprises two openable lids which carry said optical system.

* * * * *